May 22, 1956  G. R. HOOVER  2,746,090
METHOD OF PAVING PIPE
Filed Sept. 17, 1952  3 Sheets-Sheet 1
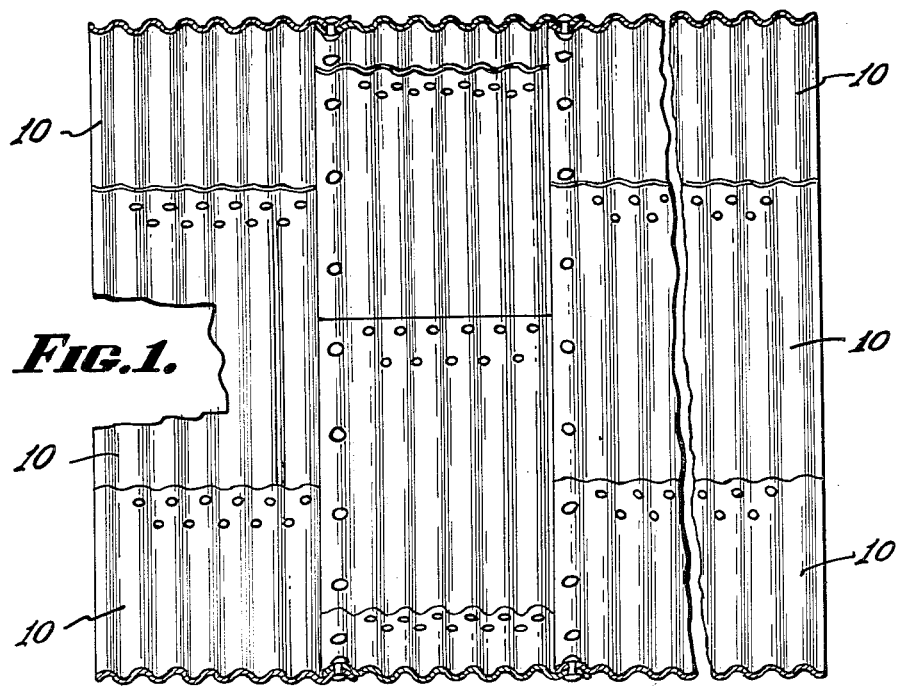
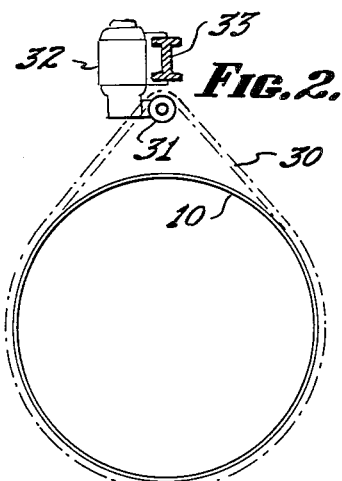
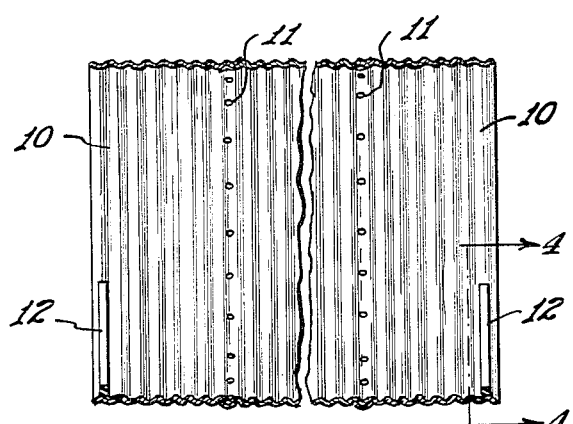
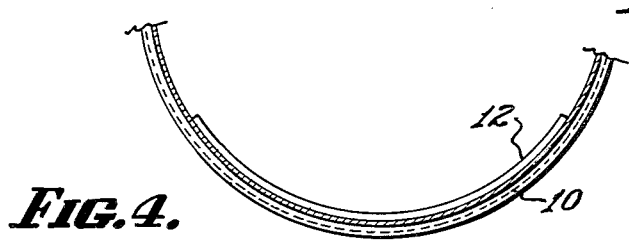
INVENTOR.
GEORGE R. HOOVER,
BY
ATTORNEYS May 22, 1956  G. R. HOOVER  2,746,090
METHOD OF PAVING PIPE
Filed Sept. 17, 1952  3 Sheets-Sheet 2
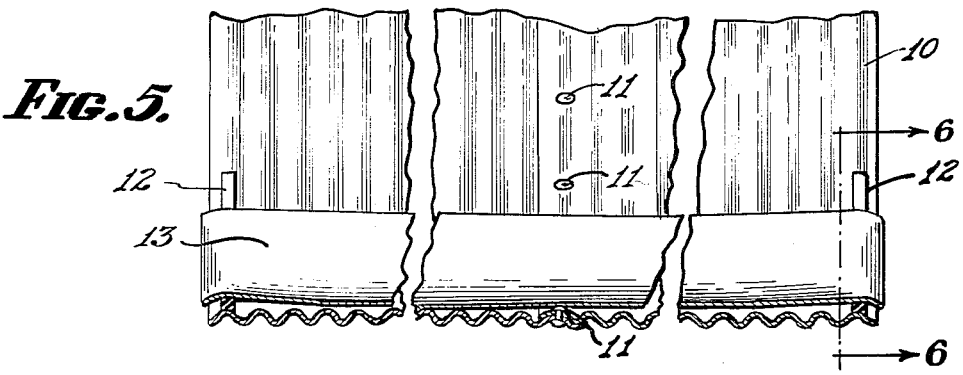
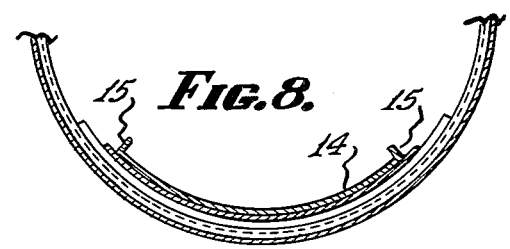
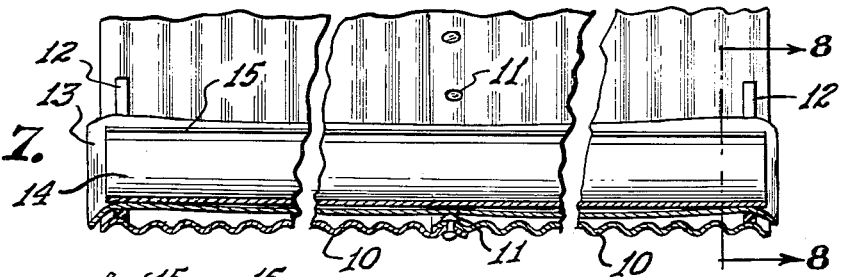
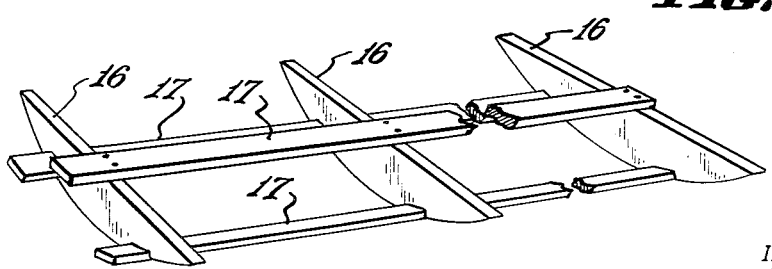
INVENTOR.
GEORGE R. HOOVER,
BY
ATTORNEYS.

May 22, 1956 G. R. HOOVER 2,746,090
METHOD OF PAVING PIPE
Filed Sept. 17, 1952 3 Sheets-Sheet 3
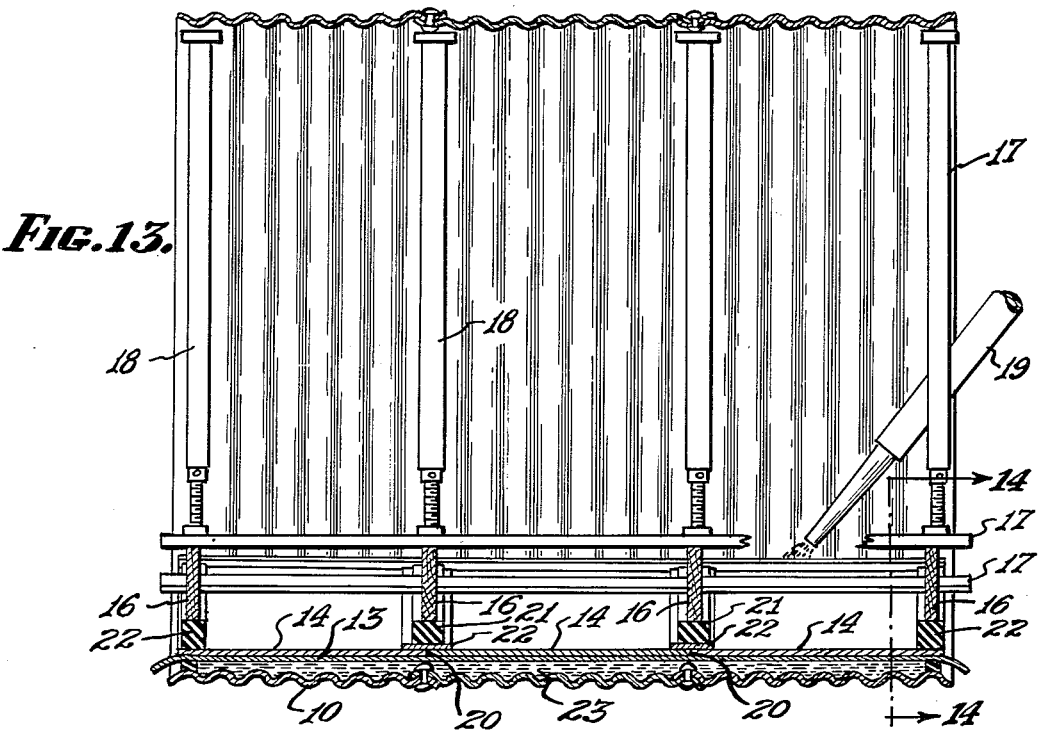
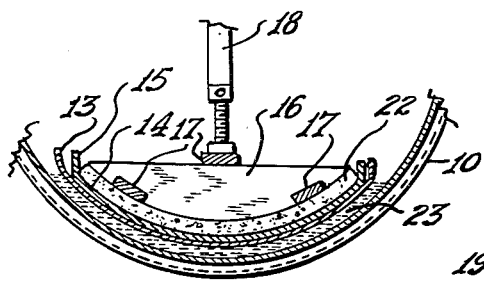
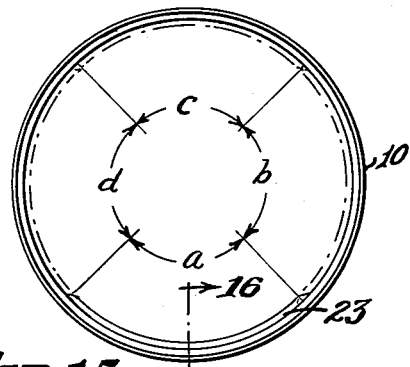
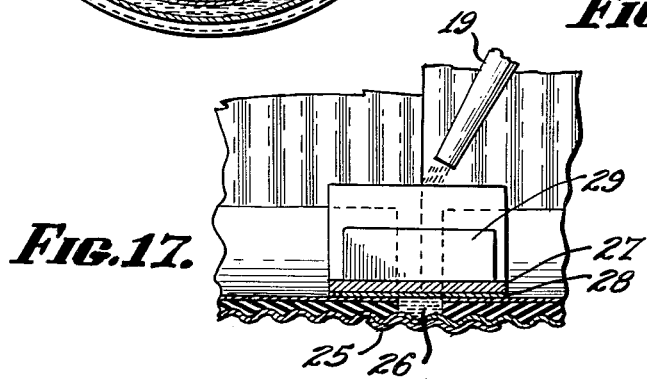
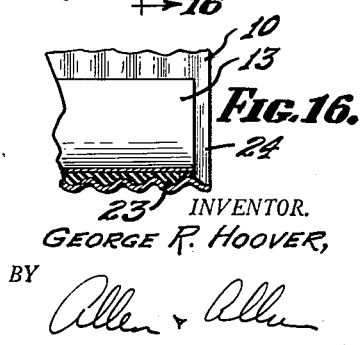
INVENTOR.
GEORGE R. HOOVER,
BY
ATTORNEYS.

United States Patent Office 2,746,090
Patented May 22, 1956

2,746,090

METHOD OF PAVING PIPE

George R. Hoover, Middletown, Ohio, assignor to Armco Steel Corporation, Middletown, Ohio, a corporation of Ohio Application September 17, 1952, Serial No. 310,017

7 Claims. (Cl. 18—59)

This invention relates to paved pipe and the method of paving such pipe. Various types of pipe used in sewer systems and the like have in recent years been provided with a paving. Most such pipe is made of corrugated sheet metal with the corrugations running circumferentially of the pipe. It has been found that flow through such pipe is enhanced and the life of the pipe is increased if the floor at least of the pipe is paved.

In recent years it has become a fairly general practice to pave such pipe with an asphaltic or bituminous material. Generally, the ends of the pipe section have been dammed and asphaltic material has been poured into the pipe. The resulting paving was of course flat and constituted a chord across the bottom of the pipe.

This procedure was extremely time-consuming and also wasteful of the asphaltic material since an excessive thickness of paving was provided which was not necessary or desirable.

With the foregoing considerations in mind it is an object of the present invention to provide a paved pipe wherein the thickness of the paving is uniform, and wherein the interior surface of the paving is substantially cylindrical in contour.

It is another object of the invention to provide a method of paving pipe which is very much faster than methods heretofore employed, and which is economical with respect to paving material.

These and various other objects of the invention which will be pointed out in greater detail hereinafter, or which will be apparent to one skilled in the art upon reading these specifications, I accomplish by that certain construction and arrangement of parts, and by that series of method steps, of which I shall now disclose certain exemplary embodiments.

Reference is made to the drawings forming a part hereof, and in which:

Figure 1 is a cross sectional view through a typical section of pipe;

Figure 2 is an end elevational view of a section of pipe showing the manner in which the pipe is rotated for certain procedures according to the present invention;

Figure 3 is a view in vertical cross section through a typical section of pipe showing dams of asphaltic material in place;

Figure 4 is a fragmentary cross sectional view taken on a line 4—4 of Figure 3;

Figure 5 is a fragmentary longitudinal cross section through a typical section of pipe showing the dams in place and a layer of parting material in place;

Figure 6 is a fragmentary cross sectional view taken on a line 6—6 of Figure 5;

Figure 7 is a view similar to Figure 5 showing a form in place on the dams;

Figure 8 is a fragmentary cross sectional view taken on a line 8—8 of Figure 7;

Figure 9 is a fragmentary perspective view of a suitable form;

Figure 10 is a perspective view of a metal strip where the form is in more than one piece;

Figure 11 is a perspective view of a piece of sponge rubber used in connection with the element of Figure 10;

Figure 12 is a perspective view of a structure for applying pressure to the form to hold it rigidly in place;

Figure 13 is a vertical cross sectional view through a section of pipe during the process of pouring;

Fig. 14 is a fragmentary cross sectional view taken on a line 14—14 of Figure 13;

Figure 15 is a diagrammatic end elevational view of a section of pipe showing how the entire interior surface of the pipe may be paved;

Figure 16 is a fragmentary cross sectional view taken on a line 16—16 of Figure 15;

Figure 17 is a fragmentary vertical cross sectional view showing how two sections of paved pipe are joined together, and how paving is supplied between the two sections.

Briefly, in the practice of my invention I provide a generally cylindrical form element and place it inside a pipe section to be paved spaced from the pipe section by means of dams or the like, and then pour liquid asphaltic material between the form and the pipe. The form is protected from the asphalt by means of a parting substance, as will be described hereinafter.

In Figure 1, I have shown a typical corrugated culvert pipe made up of arcuate plate sections indicated generally at 10 which are riveted together to form a full-round pipe. It will be understood that where I refer to pipe I intend to include not only the full-round pipe, but also prestressed pipe of noncircular configuration, and the so-called arch type of pipe.

In Figure 3, I have shown a pipe section in which there are annular rows of rivets indicated at 11. There may, or may not be, transverse joints as shown in Figure 1, and it should be noted that the specific structure of the pipe itself is not in any sense a limitation upon the invention.

As a first step in preparing for the pouring of the paving I provide at each end of the section to be paved a dam as indicated at 12. Preferably, I employ for these dams asphalt strip in solid form, and preferably the thickness of the asphalt strip will be on the order of the height of the rivet heads, in the particular pipe section.

Having placed the dams in position as shown in Figures 3 and 4, and it should be noted that these dams lie on the terminal crests of the corrugations at each end of the section, I lay over these dams in the area to be paved a layer of a parting substance indicated generally at 13. The parting substance is for the purpose of permitting the form to be stripped without adhering to the asphalt. A material which I have found to be highly suitable for this purpose is a water-proof paper. By way of example I have used 20 pound grade waxed paper with excellent results, as well as 80 pound grade kraft paper waterproof with similarly excellent results. It will be noted that the layer of paper rests on the dams 12 and on the rivet heads 11.

Over the parting substance 13, I then lay a form which may be an arcuate piece of sheet metal of perhaps 20 gauge, and it may be provided with flanges. Thus, the form member is indicated at 14, and the flanges thereof at 15.

In Figure 7 the assembly is clearly shown, and it will be observed that a space is provided between the form 14 and the plates of which the pipe is made, and which are indicated at 10, and that the parting substance is in a position to protect the form 14 from the asphalt which is to be poured into the intervening space. The form and the parting substance rests on the dams 12 and rivet heads 11.

Means must be provided for weighting the form and holding it in position rigidly for the pouring operation. This may be accomplished by loading the form with cinder blocks, stones or weights of other descriptions, or by providing bulkheads at the ends of the form and simply filling the form with water. A particularly preferable embodiment has been illustrated in Figures 12–14 inclusive.

Thus, in Figure 12, I have shown a framework comprising a number of arcuate bulkhead members 16 of a size and shape to fit the interior of the form 14, and the bulkheads 16 are held in spaced relation by means of longitudinal members 17. The structure of Figure 12 is placed in position in the form 14 and conventional jacks 18 are positioned one over each of the bulkheads 16 and extending vertically in the pipe. The jacks are tightened until the form is firmly held in place in the pipe. At this point the asphalt may be poured by means of a spout or the like as indicated at 19.

In Figure 13, another feature is shown in that the form 14 is in a number of pieces as it would have to be if the pipe section were of great length. There are thus joints at 20. At the joints, I prefer to lay in the form a curved segment 21, as shown in perspective in Figure 10, and over the member 21, I lay the piece of sponge rubber 22 shown in Figure 11. The bulkheads 16 then rest upon the sponge rubber element 22 so that pressure is evenly distributed and the joint between the form members 14 is made smooth. This arrangement is seen in cross section in Figure 14.

The asphaltic or bituminous material is poured through a nozzle or the like 19 to fill the space between the parting substance 13 and the pipe as indicated at 23. When the pouring operation has been completed the asphalt is cooled. I have found that for many cases with smaller diameters of pipe a pouring temperature of 325° F. is satisfactory, but for larger diameter pipe it is preferable to operate with an asphalt temperature above 360° F. The optimum conditions are found at asphalt temperatures from 400° F.–410° F.

I have found that the minimum cooling time for the asphalt should be not less than thirty minutes and will of course vary depending upon the ambient temperature. The asphalt may also be water-cooled, which will reduce the minimum cooling time to about ten minutes quite satisfactorily.

When the asphalt has cooled the jacks may be removed, or the weights which had held the form in place may be removed and the form stripped. The pipe section is then ready for trimming and if a kraft paper or the like has been used for the parting substance the paper may be neatly trimmed and the pipe is ready for shipment for installation.

In Figure 15, I have indicated the preferred extent of the paving operation described above, and it will be seen that this takes in approximately 25% of the circumference of the pipe. If it is then desired to pave the entire pipe this may be accomplished in four steps by rotating the pipe to 90° and repeating the operations described above each time. It will, of course, be understood that instead of rotating the pipe four times and paving one-fourth of it each time, it could within the scope of the present invention be paved over one-third of its extent and rotated three times or any other aliquot number of times.

From Figure 16 it will be observed that the asphalt dams 12 have merged with the asphaltic paving material 23 and have lost their identity. It will also be observed in Figure 16 that there is no paving over one-half of a corrugation, as indicated at 24. Thus, when two sections of pipe are joined together by means of clamping bands or the like as shown at 25 in Figure 17, there will be a space of approximately a full corrugation in which there is no paving material. This space indicated at 26 in Figure 17 may be paved on the job in the field by simply putting in position a small form indicated generally at 27 with a layer of parting substance 28 and suitably weighting it as at 29. Asphaltic material may be poured into the space 26 by means of the nozzle 19 as described above. After the material in the space 26 has cooled the weight 29 is removed and the form 27 is stripped.

A final result is a pipe having a paving of desired circumferential extent which is of sufficient depth to fill the hollows of the corrugations and to extend above the crests thereof to approximately the height of the rivet heads. The paving is of substantially uniform thickness and considerable asphaltic material is saved. Also, since less asphaltic material is used, it cools more quickly and a great saving in time is effected.

For the purpose of paving the entire inside circumference of a pipe section the pipe section may for the paving operation be suspended in a chain sling, as shown in Figure 2. A chain is indicated at 30, and it will be understood that a number of such chains are provided passing around the pipe section, and also over a pulley or sprocket 31, which is driven by means of an electric motor 32 suitably mounted on an overhead beam 33. By this arrangement the pipe can conveniently be rotated any desired amount for a succeeding paving operation.

It will be understood that numerous modifications may be made without departing from the spirit of my invention, and that I therefore do not intend to limit myself except as set forth in the claims which follow.

Having now fully described my invention what I claim as new and desire to secure by Letters Patent, is:

1. The method of paving a corrugated sheet metal pipe section with asphaltic material, which includes the steps of providing a dam at each end of said pipe section, said dams having a height approximately the height of rivet heads, placing a layer of parting material over the portion of the interior of said section to be paved, placing a form, having a contour substantially corresponding to the cross section of that portion of the pipe to be paved, over said parting material and resting on said dams and rivet heads, applying pressure to said form to hold it rigidly in place, and pouring said asphaltic material into the space between said pipe and said form between said dams.

2. The method of paving a corrugated sheet metal pipe section with asphaltic material, which includes the steps of providing a dam at each end of said pipe section, said dams having a height approximately the height of rivet heads, placing a layer of parting material over the portion of the interior of said section to be paved, placing a form, having a contour substantially corresponding to the cross section of that portion of the pipe to be paved, over said parting material and resting on said dams and rivet heads, applying pressure to said form to hold it rigidly in place, and pouring said asphaltic material at a temperature between 360° F. and 410° F. into the space between said pipe and said form between said dams.

3. The method of paving a corrugated sheet metal pipe section with asphaltic material, which includes the steps of providing a dam at each end of said pipe section, said dams having a height approximately the height of rivet heads, laying a sheet of waterproof kraft paper over the portion of the interior of said section to be paved, placing a form, having a contour substantially corresponding to the cross section of that portion of the pipe to be paved, over said paper and resting on said dams and rivet heads, applying pressure to said form to hold it rigidly in place, and pouring said asphaltic material into the space between said pipe and said form between said dams.

4. The method of paving a corrugated sheet metal riveted pipe section with asphaltic material, which includes the steps of providing a strip of solid asphaltic material on the last corrugation crest at each end of said section to constitute a dam, the thickness of said strips approximately the height of rivet heads, placing a layer of parting material over the portion of the interior of said section to be paved placing a form, having a contour substantially corresponding to the cross section of that portion of the pipe to be paved, over said parting material and resting on said dams and rivet heads, applying pressure to said form to hold it rigidly in place, and pouring said asphaltic material into the space between said pipe and said form between said dams.

5. The method of paving a corrugated sheet metal riveted pipe section with asphaltic material, which includes the steps of providing a strip of solid asphaltic material on the last corrugation crest at each end of said section to constitute a dam, the thickness of said strip approximating the height of rivet heads, placing a layer of parting material over the portion of the interior of said section to be paved, placing a form, having a contour substantially corresponding to the cross section of that portion of the pipe to be paved, over said parting material and resting on said dams and rivet heads, applying pressure to said form to hold it rigidly in place, and pouring said asphaltic material at a temperature between 360° F. and 410° F. into the space between said pipe and said form between said dams.

6. The method of paving a corrugated sheet metal riveted pipe section with asphaltic material, which includes the steps of providing a strip of solid asphaltic material on the last corrugation crest at each end of said section to constitute a dam, the thickness of said strips approximating the height of rivet heads, laying a sheet of waterproof kraft paper over the portion of the interior of said section to be paved, placing a form, having a contour substantially corresponding to the cross section of that portion of the pipe to be paved, over said paper and resting on said dams and rivet heads, applying pressure to said form to hold it rigidly in place, and pouring said asphaltic material into the space between said pipe and said form between said dams.

7. The method of paving a corrugated sheet metal pipe section with asphaltic material, which includes the steps of providing a dam at each end of said pipe section, placing a layer of parting material over the portion of the interior of said section to be paved, placing a form, having a contour substantially corresponding to the cross section of that portion of the pipe to be paved, and having end bulkheads, over said parting material and resting on said dams, filling said form with water to hold it rigidly in place, and pouring said asphaltic material into the space between said pipe and said form between said dams.

References Cited in the file of this patent

UNITED STATES PATENTS

| Number | Name | Date |
|---|---|---|
| 1,022,841 | Giletti | Apr. 9, 1912 |
| 1,412,392 | Earley | Apr. 11, 1922 |
| 1,532,555 | Rice | Apr. 7, 1925 |
| 1,733,006 | Cook et al. | Oct. 22, 1929 |
| 1,984,125 | Freeze et al. | Dec. 11, 1934 |
| 1,991,455 | Gottwald | Feb. 19, 1935 |
| 2,143,576 | Replogle et al. | Jan. 10, 1939 |
| 2,259,035 | Gillican | Oct. 14, 1941 |
| 2,313,985 | Bradshaw | Mar. 16, 1943 |